United States Patent [19]

Watanabe

[11] Patent Number: 4,740,811
[45] Date of Patent: * Apr. 26, 1988

[54] INDICATOR FOR INDICATING A RANGE OF IMAGE FORMATION FOR AN IMAGE FORMING APPARATUS

[75] Inventor: Junji Watanabe, Yokohama, Japan

[73] Assignee: Kabushiki Kaisha Toshiba, Kawasaki, Japan

[*] Notice: The portion of the term of this patent subsequent to Apr. 7, 2004 has been disclaimed.

[21] Appl. No.: 1,153

[22] Filed: Jan. 7, 1987

Related U.S. Application Data

[62] Division of Ser. No. 842,243, Mar. 21, 1986, Pat. No. 4,655,585.

[30] Foreign Application Priority Data

Apr. 19, 1985 [JP] Japan .................................. 60-83971
Apr. 27, 1985 [JP] Japan .................................. 60-91420

[51] Int. Cl.$^4$ ............................................. G03B 27/52
[52] U.S. Cl. ........................................ 355/61; 355/7; 355/14 R; 355/59
[58] Field of Search ..................... 355/61, 7, 14 R, 7, 355/59, 8

[56] References Cited

U.S. PATENT DOCUMENTS

| | | | |
|---|---|---|---|
| 4,105,327 | 8/1978 | Gibson et al. | 355/59 |
| 4,303,332 | 12/1981 | Sakai | 355/7 X |
| 4,340,295 | 7/1982 | Nakamura | 355/14 R |
| 4,371,898 | 2/1983 | Nakamura | 355/7 X |
| 4,451,142 | 6/1984 | Takenaka et al. | 355/55 |
| 4,505,579 | 3/1985 | Furuichi | 355/14 R |
| 4,586,808 | 5/1986 | Tanimoto et al. | 355/8 |
| 4,597,663 | 7/1986 | Yoshiura et al. | 355/14 R |
| 4,618,244 | 10/1986 | Watanabe | 355/8 |
| 4,655,585 | 4/1987 | Watanabe | 355/61 |

FOREIGN PATENT DOCUMENTS 3321507 2/1984 Fed. Rep. of Germany.

Primary Examiner—Richard A. Wintercorn
Attorney, Agent, or Firm—Cushman, Darby & Cushman

[57] ABSTRACT

An image forming apparatus is provided with a pair of pointers for indicating a range for image formation on an original table. The pointers, which are driven by a pulse motor, can move in a direction perpendicular to the moving direction of an optical system for optically scanning the original. A stopper is attached to at least one end portion of a minimum range for image formation indicated by the pointers. The stopper serves to stop the pointer at position indicating the minimum range. In setting the initial positions of the pointers, pulse output means supplies the pulse motor with a necessary number of pulses for the movement of the indicating means from the minimum-range position to the maximum-range position, thereby causing the pointers to move to a position abutting the stopper.

6 Claims, 10 Drawing Sheets

F I G. 12
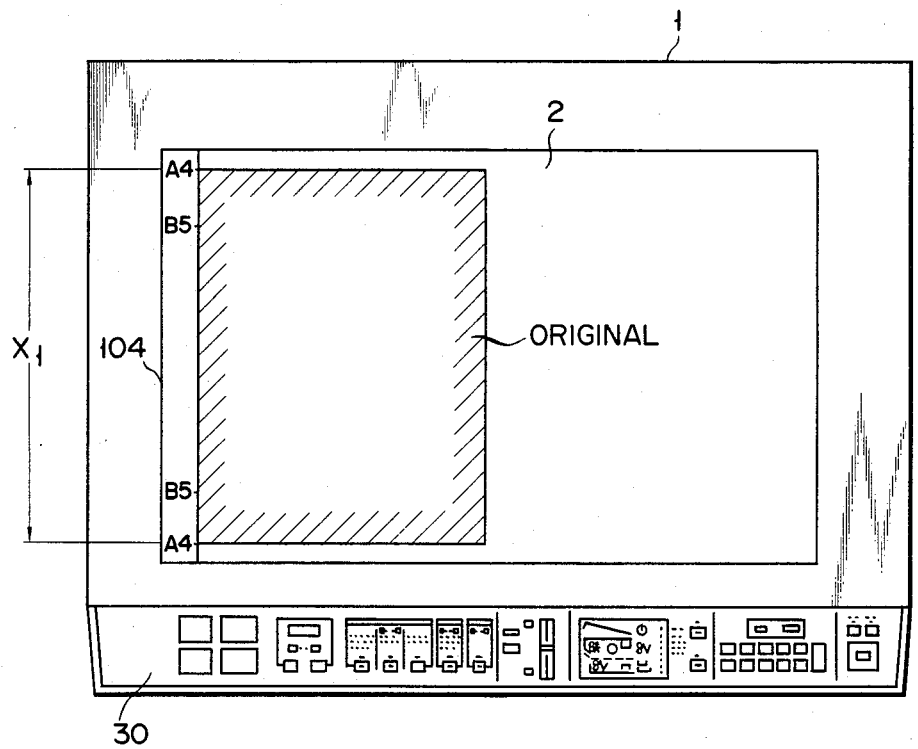

INDICATOR FOR INDICATING A RANGE OF IMAGE FORMATION FOR AN IMAGE FORMING APPARATUS

This is a division, of application Ser. No. 842,243 filed Mar. 21, 1986 now U.S. Pat. No. 4,655,585.

BACKGROUND OF THE INVENTION

The present invention relates to an image forming apparatus such as a copying machine, and more specifically to an image forming apparatus capable of indicating a range for image formation on an original table.

Image forming apparatuses, such as copying machines, have recently been put to practical use which indicate a copiable range on their original table.

In one such conventional apparatus, an original table made of transparent glass is placed on the top of its housing. An original scale with graduations is attached to one side of the table. Underlying the scale, a pair of pointers are moved in the longitudinal direction of the scale by a suitable drive source. The pointers indicate the copiable range on the table when they stop at their respective predetermined positions relative to the scale. Based on this indication, an operator sets an original on the table, holding it against a side edge of the scale. Thereafter, he or she puts an original cover on the original and depresses a copy key, thus starting a copying operation.

In this prior art apparatus, however, the initial positions of the pointers are determined by moving the pointers toward their corresponding ends of the original scale so that either of them turns on a microswitch provided in the vicinity of an end of the maximum copiable range indicated by the pointers. Thus, the apparatus requires many components, resulting in an increase in cost.

Thereupon, the microswitch is replaced with a stopper, and a pulse motor is used as the drive source for the pointers. According to this arrangement, either of the pointers is caused to move to a position abutting the stopper so that the motor is compulsorily stopped despite the input of driving pulses.

When stopped in this manner, however, the pulse motor would produce a great noise.

SUMMARY OF THE INVENTION

A first object of the present invention is to provide an image forming apparatus in which the initial position of indicating means is determined by compulsorily stopping the drive of driving means, so that the components required for the apparatus are reduced in number, lowering its cost.

A second object of the invention is to provide an image forming apparatus capable of lowering the noise produced by the compulsory stop of the driving means.

According to an aspect of the present invention, there is provided an image forming apparatus which comprises an original table on which an original is disposed, an optical system for optically scanning the original on the original table from one side thereof to the other, indicating means movable in a direction perpendicular to the scanning direction of the optical system and indicating a range for image formation on the original table, the range varying between minimum and maximum values, stopper means attached to at least one end portion of a region indicative of the minimum value and adapted to stop the indicating means so as to indicate the minimum value, drive means for moving the indicating means in accordance with pulses applied thereto, and pulse output means for delivering the pulses to the drive means, the output means being adapted to deliver a necessary number of pulses for the movement of the indicating means from the minimum-value position to the maximum-value position, thereby causing the indicating means to move to a position abutting the stopper means, in setting the initial position of the indicating means.

BRIEF DESCRIPTION OF THE DRAWINGS

FIG. 12 is a plan view for illustrating the operation of the pointers.

DETAILED DESCRIPTION OF THE PREFERRED EMBODIMENT

One embodiment of the present invention will now be described in detail with reference to the accompanying drawings.

Figure 1:
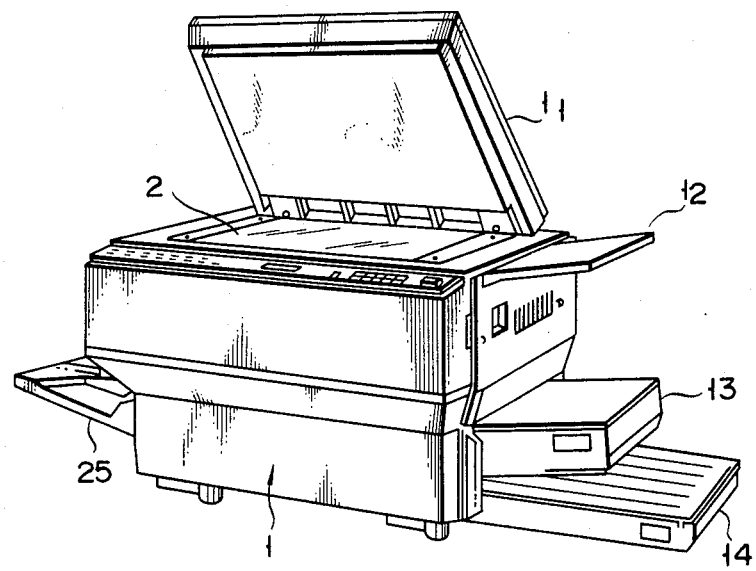
FIG. 1 is a perspective view showing an outline of a copying machine as an image forming apparatus according to one embodiment of the present invention.
Figure 2:
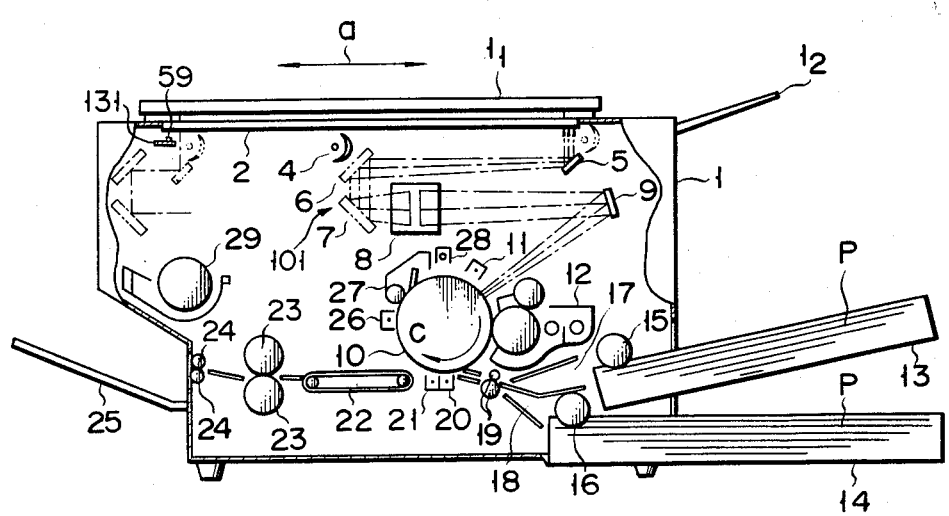
FIG. 2 schematically shows the internal construction of the copying machine.

FIGS. 1 and 2 schematically show the external appearance and internal mechanism, respectively, of a copying machine as an image forming apparatus according to one embodiment of the invention. Numeral 1 designates a housing of the machine. Housing 1 includes original table 2 (transparent glass plate) for supporting the original thereon. Swingable original cover $1_1$ and worktable $1_2$ are arranged in the vicinity of table 2. Disposed below table 2 is optical system 101 which includes exposure lamp 4 and mirrors 5, 6 and 7 reciprocating in the direction indicated by arrow a, lens block 8 movable along the optical axis, and fixed mirror 9. As system 101 optically scans the surface of the original, an image impression on the original is projected on the surface of photosensitive drum 10 (slit exposure). Drum 10 is rotated in the direction indicated by arrow c to have its surface charged by main charger 11, and then subjected to the slit exposure to the image impression. As a result, an electrostatic latent image corresponding to the image impression of the original is formed on the surface of drum 10. The latent image is visualized when a toner is applied to it by developing device 12.

Paper sheets (image forming media) P are taken out one by one from either upper or lower paper cassette 13 or 14 by paper-supply roller 15 or 16. Each delivered sheet P is guided to a pair of aligning rollers 19 through paper guide path 17 or 18. Then, it is fed to a transfer region defined between drum 10 and transfer charger 20 by rollers 19. Cassettes 13 and 14 are removably attached to the lower right end portion of housing 1. Cassette 13 or 14 is selected by operating one of cassette selection keys $30_4$ on control panel 30 mentioned later. Sheet P delivered to the transfer region comes intimately into contact with the surface of photosensitive drum 10 when it reaches transfer charger 20. In this state, charger 20 transfers the toner image on drum 10 onto sheet P. After the transfer, sheet P is electrostatically separated from drum 10 by separation charger 21. Thereafter, it is fed to a pair of fixing rollers 23 at the terminal end side of conveyor belt 22 by the belt. As sheet P passes between fixing rollers 23, the transferred image is fixed on the sheet. After the fixation, sheet P is discharged onto tray 25 outside housing 1 by a pair of exit rollers 24. After the transfer process, moreover, the surface of photosensitive drum 10 is de-electrified by de-electrification charger 26, and the toner remaining on the surface is then removed by cleaner 27. Thereafter, a residual latent image on drum 10 is erased by discharge lamp 28. Thus, drum 10 is restored to its initial state. In FIG. 2, numeral 29 designates a cooling fan for preventing the temperature inside housing 1 from rising.

Figure 3:
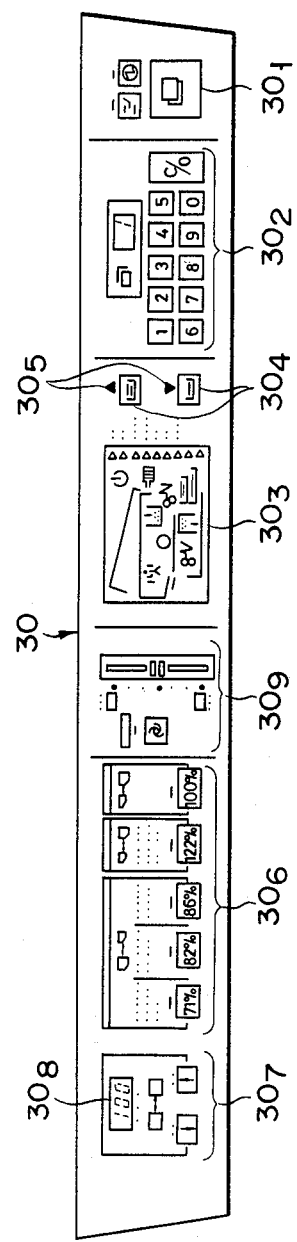
FIG. 3 is a plan view showing a control panel.

FIG. 3 shows control panel 30 mounted on housing 1. Panel 30 carries thereon copy key $30_1$ for starting copying operation, ten-keys $30_2$ for setting the number of copies, etc., display section $30_3$ for indicating the operation modes of various sections, paper jamming, etc., cassette selection keys $30_4$ for selecting upper or lower paper cassette 13 or 14, and cassette indicators $30_5$ for indicating the selected cassette. Panel 30 is further provided with ratio setting keys $30_6$ for setting predetermined enlargement or reduction ratios, zoom keys $30_7$ for adjustably setting the ratio, display section $30_8$ for indicating the set ratio, and density setting section $30_9$ for setting the copy density.

Figure 4:
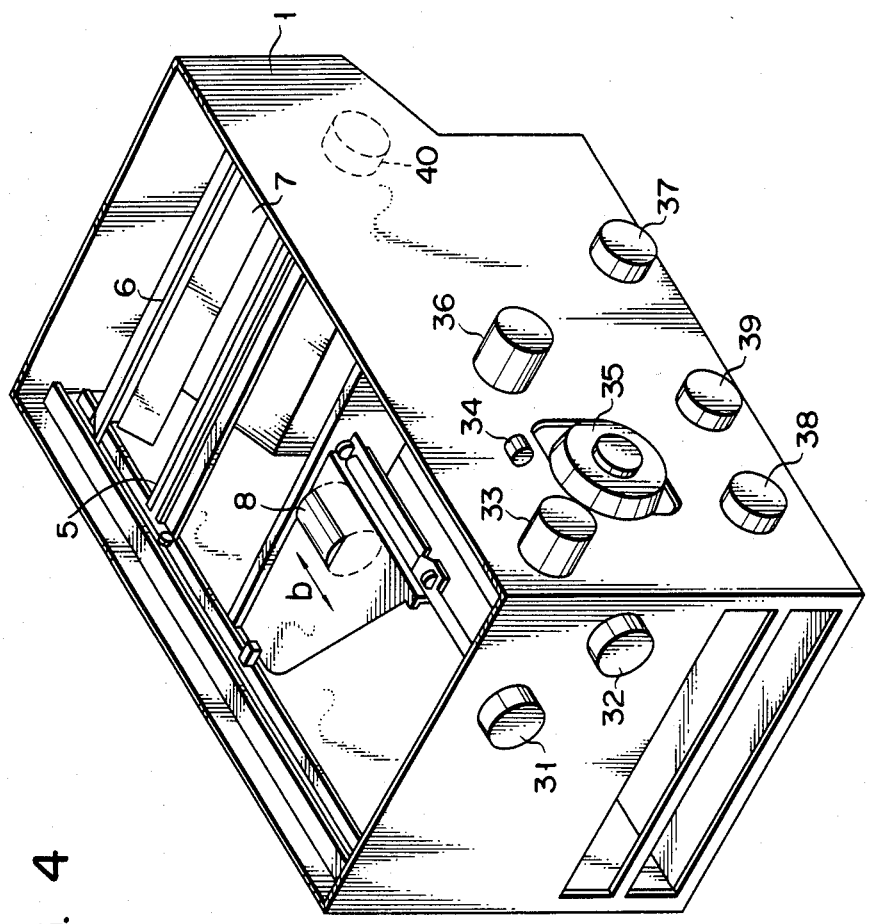
FIG. 4 is a perspective view showing an arrangement of driving sections.

FIG. 4 shows a specific arrangement of drive sources for several driving sections of the copying machine constructed in the aforesaid manner. The drive sources include lens drive motor 31 for shifting the position of lens block 8 for scale change, mirror drive motor 32 for changing the distances (optical path length) between mirror 5 and mirror 9 for the scale change, and scanning motor 33 for moving exposure lamp 4 and mirrors 5, 6 and 7 for original scanning. The sources further include shutter drive motor 34 for shifting shutters 102 and 103 (mentioned later) to adjust the width of that region of photosensitive drum 10 charged by charger 11 at the time of the scale change, developing motor 35 for driving a developing roller of developing device 12 and the like, drum drive motor 36 for driving drum 10, and fixing motor 37 used to drive conveyor belt 22, fixing rollers 23, and exit rollers 24. There are also shown paper-supply motor 38, feed motor 39, and fan drive motor for driving paper-supply rollers 15 and 16, aligning rollers 19, and cooling fan 29, respectively.

Figure 5:
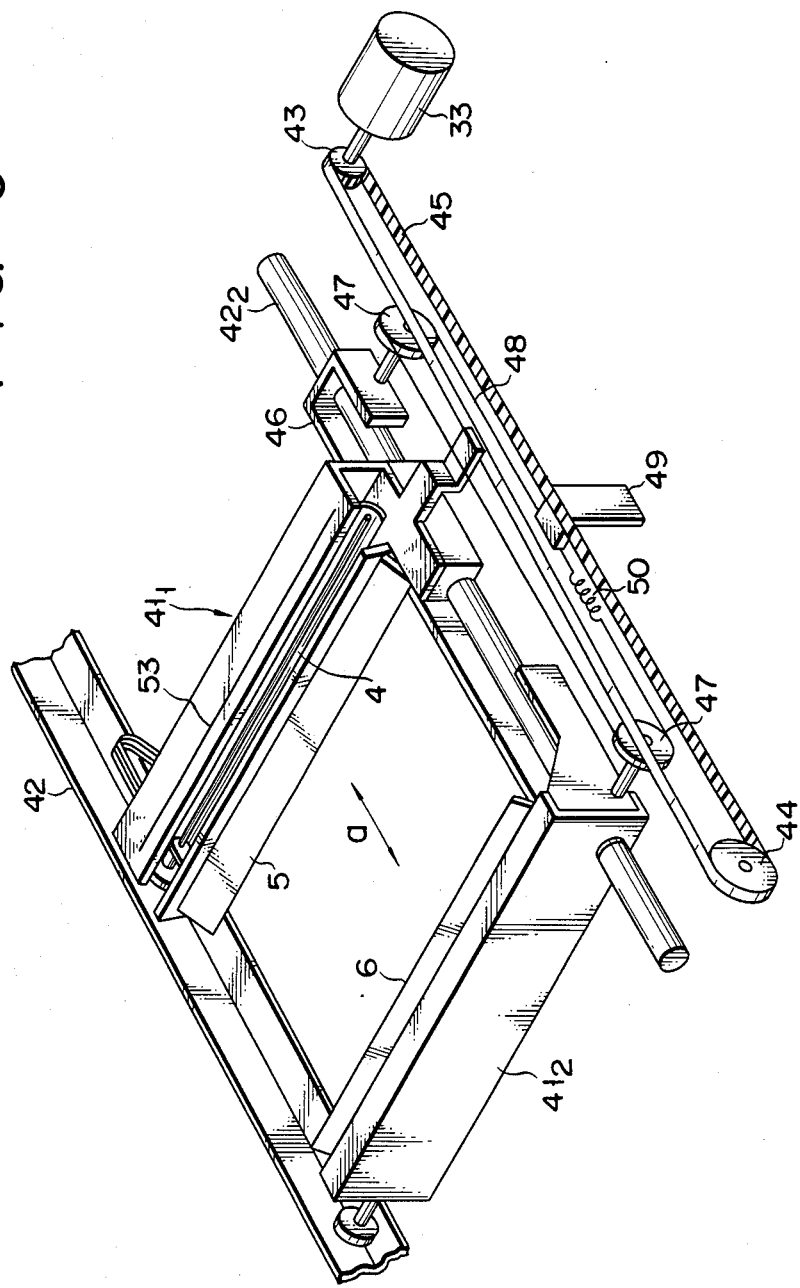
FIG. 5 is a perspective view schematically showing a drive mechanism for an optical system.
Figure 6:
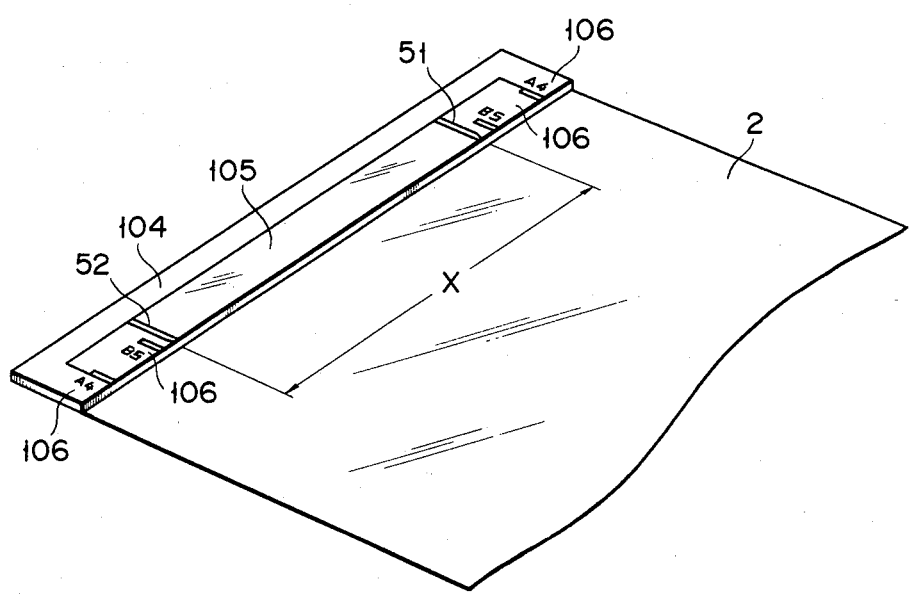
FIG. 6 is a perspective view showing an original scale.
Figure 7:
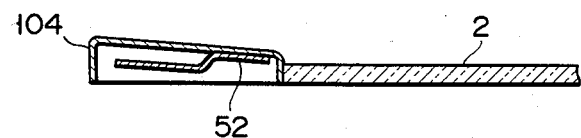
FIG. 7 is a sectional view of the original scale.

FIG. 5 shows a drive mechanism for reciprocating the optical system. Mirror 5 and exposure lamp 4 are supported by first carriage $41_1$, and mirrors 6 and 7 by second carriage $41_1$. Carriages $41_1$ and $41_2$ can move parallel to each other in the direction of arrow a, guided by guide rails $42_1$ and $42_2$. Four-phase pulse motor 33 serves to drive pulley 43. Endless belt 45 is stretched between pulley 43 and idle pulley 44. One end of first carriage $41_1$ supporting mirror 5 is fixed to belt 45. A pair of pulleys 47 are rotatably mounted on guide portion 46 of second carriage $42_2$ supporting mirrors 6 and 7, spaced in the axial direction of rail $42_2$. Wire 48 is stretched between pulleys 47. One end of wire 48 is fixed to fixed portion 49, while the the other end is coupled to coil spring 50 which is fixed to portion 49. The one end of carriage $41_1$ is fixed to wire 48. As pulse motor 33 rotates, therefore, belt 45 rotates to move first carriage $41_1$, so that second carriage $42_2$ also moves. At this time, pulleys 47 serve as running pulleys, so that second carriage $42_2$ moves in the same direction as and at half the speed of first carriage $42_2$. The moving direction of the carriages is controlled by changing the rotating direction of pulse motor 33.

Original scale 104 indicating the original size is attached to one side portion of original table 2. The original is placed on table 2, regulated by the side edge of scale 104. Part of scale 104 is formed of transparent material. Transparent portion 105 of scale 104 is marked with graduations 106 which indicate positions corresponding to different original sizes. A pair of pointers 51 and 52 (mentioned later) underlie scale 104, opposed close to portion 105 without projecting into the scanning region of optical system 101.

Figure 8:
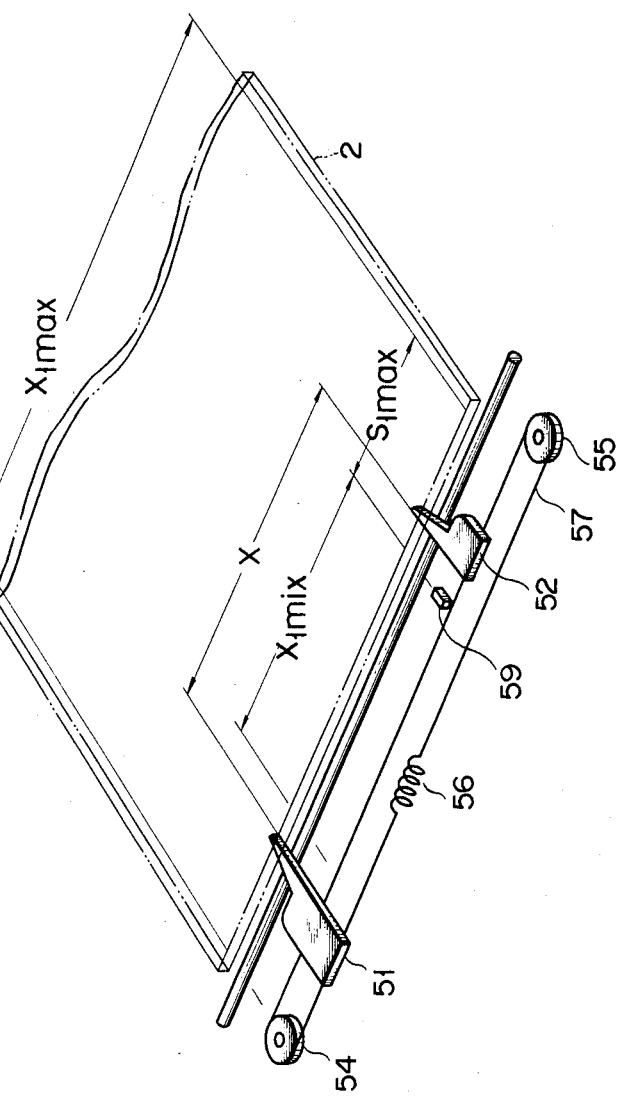
FIG. 8 is a perspective view showing a pair of pointers and a stopper.

A copiable range is marked on original table 2, corresponding to the size of specified sheet P. If the sheet size specified by one of cassette selection keys $30_4$ is $(P_x, P_y)$, and if the enlargement or reduction ratio designated by any of ratio setting keys $30_6$ and $30_7$ is K, copiable range (x, y) is given by $x = P_x/K$ and $y = P_y/K$. As shown in FIG. 8, the x-direction width of range (x, y) is defined by pointers 51 and 52 under table 2. The y-direction width of the range is indicated by scale 53 which is provided on the top of first carriage $41_1$.

As shown in FIG. 8, pointers 51 and 52 are attached to endless wire 57 which, combined with spring 56, is stretched between pulleys 54 and 55. Pulley 55 is rotated by pulse motor 58 which will be described in detail later. The distance between pointers 51 and 52 can be varied by driving motor 58 according to the sheet size and the enlargement or reduction ratio. If the maximum and minimum distances between pointers 51 and 52 are defined by $X_{1max}$ and $X_{1min}$, respectively, maximum moved distance $S_{1max}$ of each pointer 51 or 52 is given by $S_{1max} = (X_{1max} - X_{1min})/2$. Stopper 59, which is disposed near the inside motion limit of pointer 52, stops the pointer to determine the initial positions of pointers 51 and 52. The stopper is formed of, e.g., rubber, and is supported by support frame 131 inside housing 1.

After the changed-scale copying is finished, pointers 51 and 52 return from its changed-scale position to full-size position (where the pointers 51 and 52 are spaced by maximum distance $X_{1max}$) in a predetermined time (about 20 to 30 seconds). Thus, the home position (which is full-size position) of each pointer is adjusted to maximum sheet width ($X_{1max}$).

First carriage $41_1$ moves to a predetermined position (home position depending on the enlargement or reduction ratio) when motor 33 is driven in accordance with the sheet size and the ratio.

If copy key $30_1$ is depressed, first carriage $41_1$ is first moved toward second carriage $41_2$, and then moved away from carriage $41_2$ when exposure lamp 4 is lit. When the original scanning ends, lamp 4 is put out, and carriage $41_1$ is returned to the home position.

Figure 9:
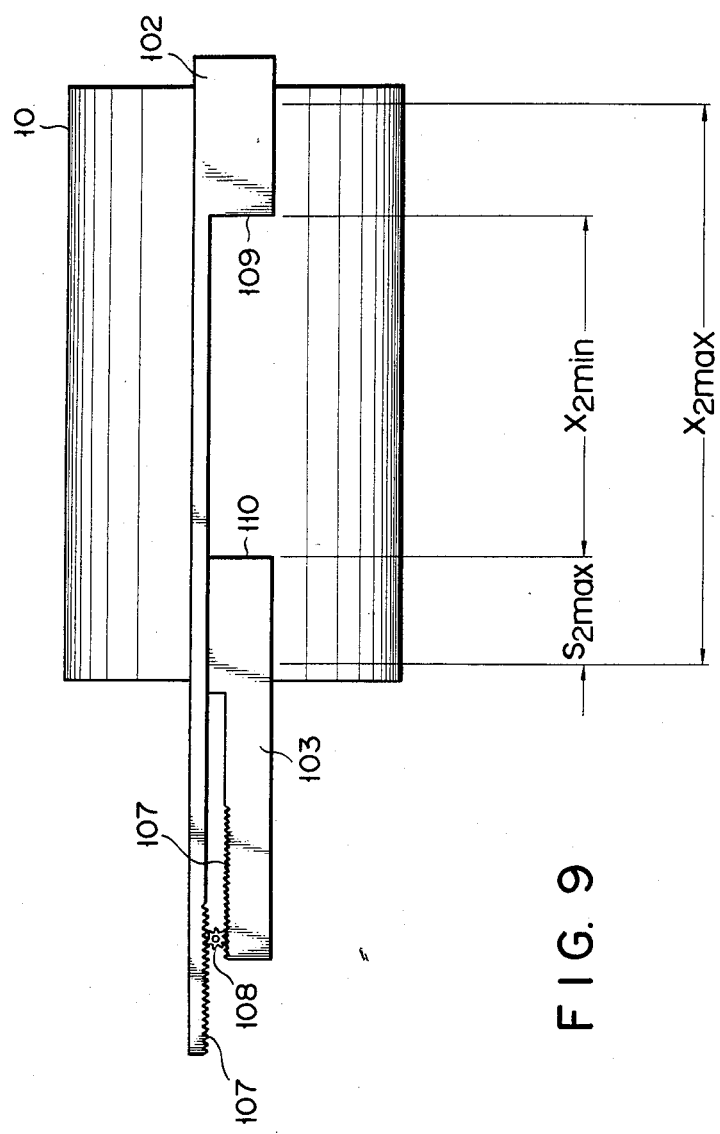
FIG. 9 is a perspective view showing an arrangement of a pair of shutter plates.

As shown in FIG. 9, first and second shutter plates 102 and 103 are arranged around photosensitive drum 10. In the changed-scale copying operation, they regulate the width of reflected light in optical system 101 so that only an effective light is incident on drum 10. Plates 102 and 103 are provided with their respective racks 107 which are in mesh with common pinion 108. Further, plates 102 and 103 are formed with cut edges 109 and 110, respectively, for intercepting the reflected light. The width of the reflected light incident on drum 10 is regulated by edges 109 and 110 approaching or receding from each other as pinion 108 rotates.

Figure 10:
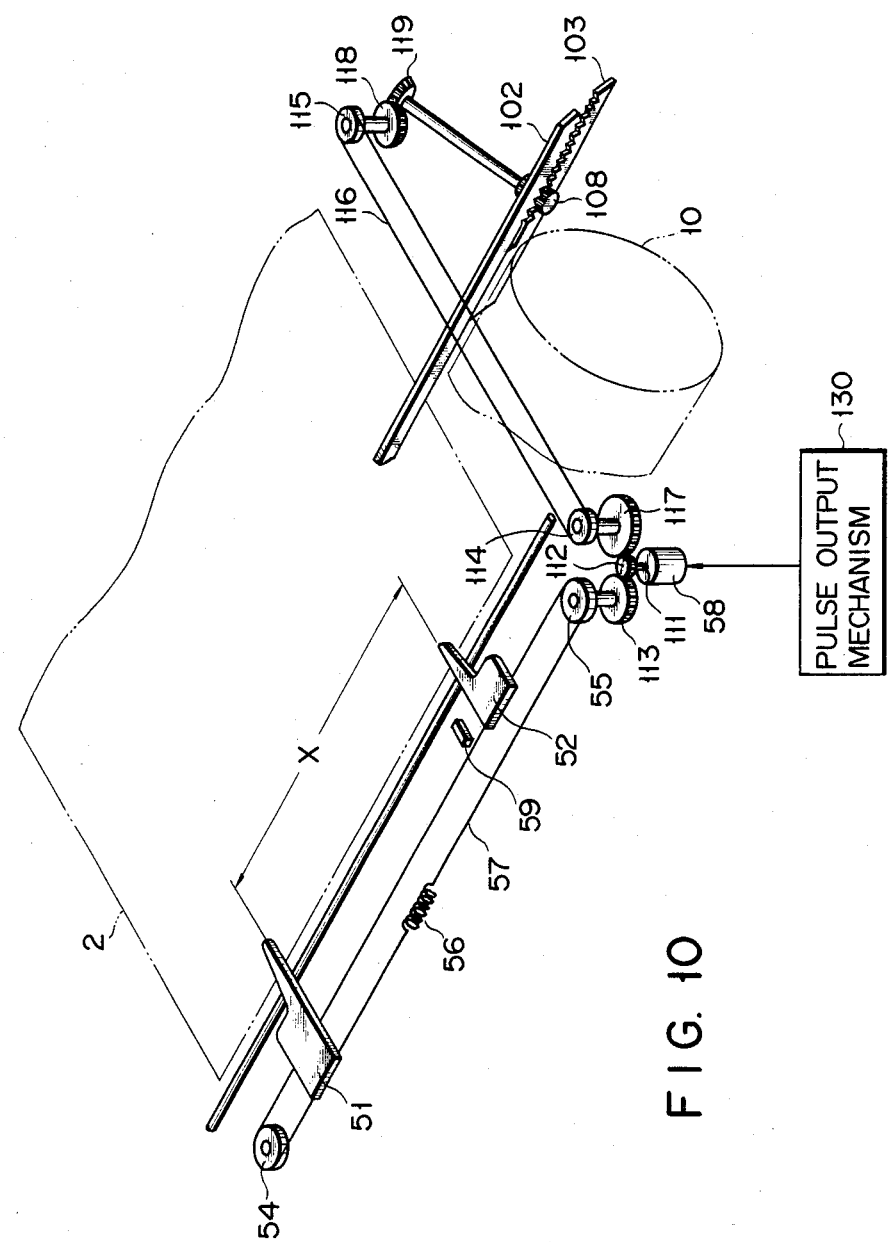
FIG. 10 is a perspective view showing drive mechanisms for the pointers and shutter plates.

As shown in FIG. 10, pointers 51 and 52 and shutter plates 102 and 103 are driven by a common drive source, e.g., pulse motor 58. Gear 112 is fixed to rotating shaft 111 of motor 58, and its rotation is transmitted to pulley 55 by means of reduction gear 113. Pulleys 114 and 115 are disposed above shutter plates 102 and 103. Endless wire 116 is stretched between pulleys 114 and 115. The rotation of gear 112 is transmitted to pulley 114 by means of reduction gear 117, and the rotation of pulley 115 is transmitted to pinion 108 via gears 118 and 119. As motor 58 rotates in accordance with the number of driving pulses from pulse output mechanism 130, pointers 51 and 52 and shutter plates 102 and 103 move synchronously.

In this case, if pulse motor 58 rotates forward, pointers 51 and 52 approach each other, while shutter plates 102 and 103 recede from each other. If motor 58 rotates reversely, on the other hand, pointers 51 and 52 recede from each other, and plates 102 and 103 approach each other. When the original is set on table 2, pointers 51 and 52 are held in positions to indicate the copiable range. While optical system 101 is in operation, plates 102 and 103 are located in their predetermined positions and pointers 51 and 52 are moved to the positions corresponding to the positions of the plates 102, 103. When the operation of system 101 is finished, pointers 51 and 52 return to their initial positions indicating the copiable range.

If the minimum and maximum distances between cut edges 109 and 110 moving with shutter plates 102 and 103 are $X_{2min}$ and $X_{2max}$, respectively, maximum moved distance $S_{2max}$ of each shutter plate 102 or 103 equals $(X_{2max}-X_{2min})/2$. Plates 102 and 103 move by $S_{2max}$ when pointers 51 and 52 are moved for $S_{1max}$ by pulse motor 58.

Figure 11:
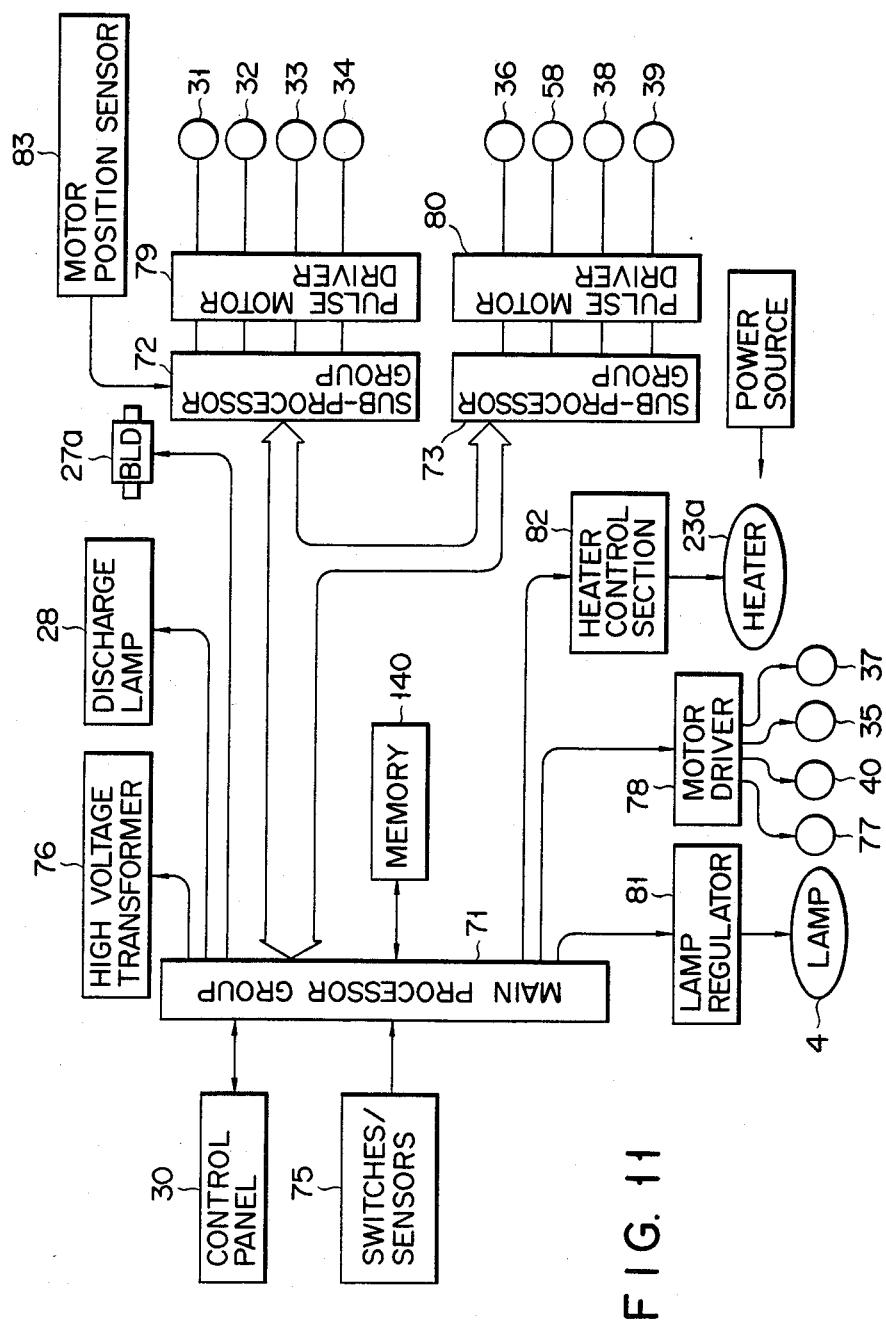
FIG. 11 is a block diagram showing a general control circuit.

FIG. 11 shows a general control circuit which is mainly composed of main processor group 71 and first and second sub-processor groups 72 and 73. Group 71 detects input signals from control panel 30 and input unit 75 including various switches or sensors, and controls, for a predetermined copying operation, high-voltage transformer 76 for driving the chargers, discharge lamp 28, blade solenoid 27a of cleaner 27, heater 23a of fixing roller 23, exposure lamp 4, motors 31 to 40 and 58, etc.

Motors 35, 37 and 40 and toner-supply motor 77 for supplying the toner to developing device 12 are controlled by main processor group 71 with the aid of motor driver 78. Motors 31 to 34 are controlled by first sub-processor group 72 through the medium of pulse motor driver 79, and motors 36, 38, 39 and 58 by second sub-processor group 73 through pulse motor driver 80. Exposure lamp 4 is controlled by group 71 with the aid of lamp regulator 81, and heater 23a by heater control section 82. A status signal from heater 23a is supplied to group 71. Group 71 gives start and stop instructions for the motors to first and second sub-processor groups 72 and 73. On the other hand, groups 72 and 73 supply group 71 with status signals indicative of the operation or stop state of the motors. Also, first sub-processor group 72 is supplied with position information from motor position sensor 83 for detecting the respective initial positions of motors 31 to 34.

The operation of the apparatus with the aforementioned construction will now be described in detail. When a power source (not shown) is turned on, main processor group 71 drives pulse motor driver 80, thereby rotating pulse motor 58 for the number of driving pulses corresponding to a moved distance of each pointer 51 or 52 which is a little longer than distance $S_{1max}$. Thus, pointer 52 never fails to abut against stopper 59 for the initial positioning without regard to its current position. At this time, motor 58, which is restricted in action by stopper 59, is compulsorily stopped despite the input of the driving pulses.

When the feed of the driving pulses to pulse motor 58 is completed, main processor group 71 drives motor 58 for distance $S_{1max}$ to restore it, thereby locating pointers 51 and 52 in their respective home positions.

In this state, if an instruction for the designation of the sheet size, reduction or enlargement is given, main processor group 71 sets pointers 51 and 52 in position by driving motor 58 for the number of pulses corresponding to the instruction.

In this case, pointers 51 and 52 move from the position for $X_{1max}$ (see FIG. 12) toward stopper 59, so that the natural rotation of motor 58 suppressed by the compulsory stop is minor. Thus, noise caused by the stop is minimized. Normally, the home position of each pointer is on or near the position for $X_{1max}$. If stopper 59 is located at the position for $X_{1min}$, therefore, the suppressed rotation of motor 58 is minimized, resulting in minimum noise.

Meanwhile, main processor group 71 drives motor 33 to move first carriage $41_1$ to a predetermined position (home position) corresponding to the sheet size and enlargement or reduction ratio. As a result, scale 53 is located correspondingly.

Thereafter, the original is set in position in accordance with indications given by pointers 51 and 52 and scale 53. Then, a normal copying operation is started when copy key $30_1$ is depressed.

In the above embodiment, the pointers are moved by means of a wire. The wire may, however, be replaced with a timing belt which provides an improved antiskid characteristic.

According to the present invention, as described above, the initial positions of pointers 51 and 52 are determined by compulsorily stopping pulse motor 58. Thus, the components used in the apparatus of the invention may be reduced in number, lowering manufacturing cost. Also, noise attributed the compulsory stop of motor 58 can be lowered.

What is claimed is:

1. An indicator for an image forming apparatus comprising:
   an original table on which an original document is disposed;
   indicating means movably provided for indicating a range for image formation on the original table by its movement, said range varying between minimum and maximum values;
   stopper means attached to at least one end portion of a region indicative of the minimum value and adapted to stop the indicating means so as to indicate the minimum value;

drive means for moving the indicating means in accordance with pulses applied thereto; and pulse output means for delivering the pulses to the drive means, said output means being adapted to deliver a necessary number of pulses for the movement of the indicating means from the minimum-value position to the maximum-value position, thereby causing the indicating means to move to a position abutting the stopper means, in setting the initial position of the indicating means.

2. The indicator according to claim 1, wherein said indicating means is located in a position for full-size image formation in a predetermined time after the end of an image forming operation.

3. The indicator according to claim 1, wherein said indicating means includes a pair of pointers moving toward and away from each other, so that the image formation range is indicated between the pointers.

4. The indicator according to claim 1, wherein said drive means includes a pulse motor for driving the indicating means.

5. The indicator according to claim 1, further comprising an original scale for indicating the original size on one side of the original table.

6. The indicator according to claim 5, wherein said indicator further comprises an optical system for optically scanning the original on the original table and said indicating means is disposed under the original scale and off the region scanned by the optical system, and said original scale is formed of a material through which the indicating means can be seen.

* * * * *